Sept. 17, 1968   H. A. LAUFMAN ETAL   3,401,766
AIR-CUSHION VEHICLE
Filed Nov. 2, 1964
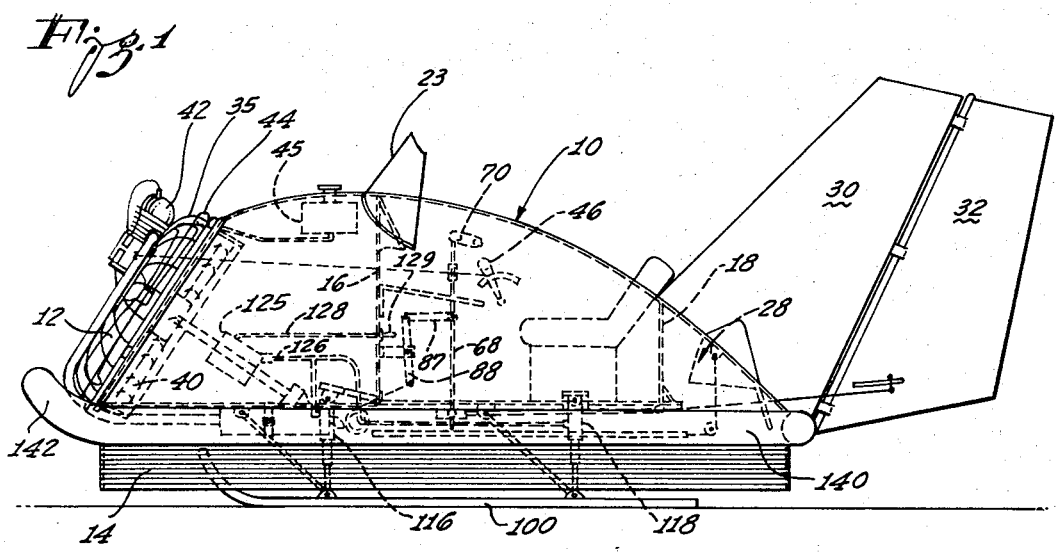
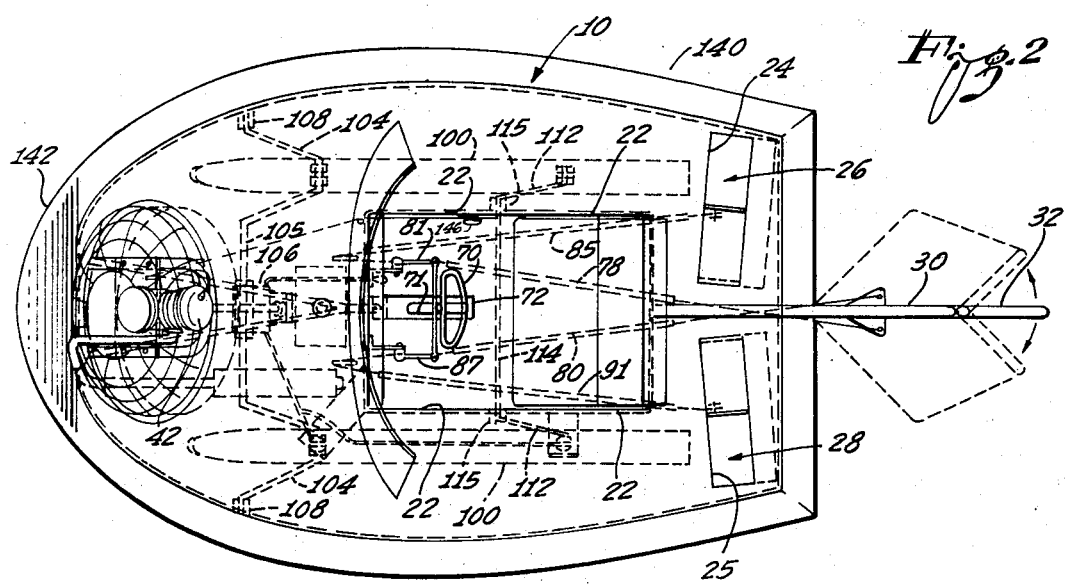
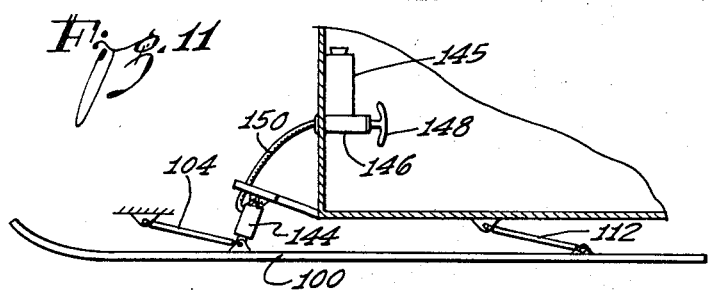
INVENTORS:
Harry A. Laufman
Donald W. Stillman
Attorneys Sept. 17, 1968   H. A. LAUFMAN ETAL   3,401,766
AIR-CUSHION VEHICLE
Filed Nov. 2, 1964   4 Sheets-Sheet 2
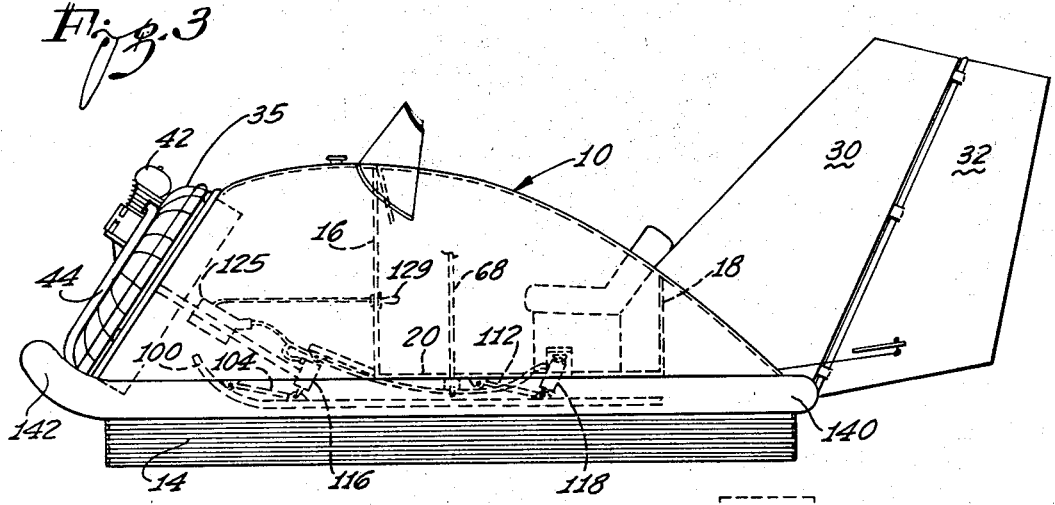
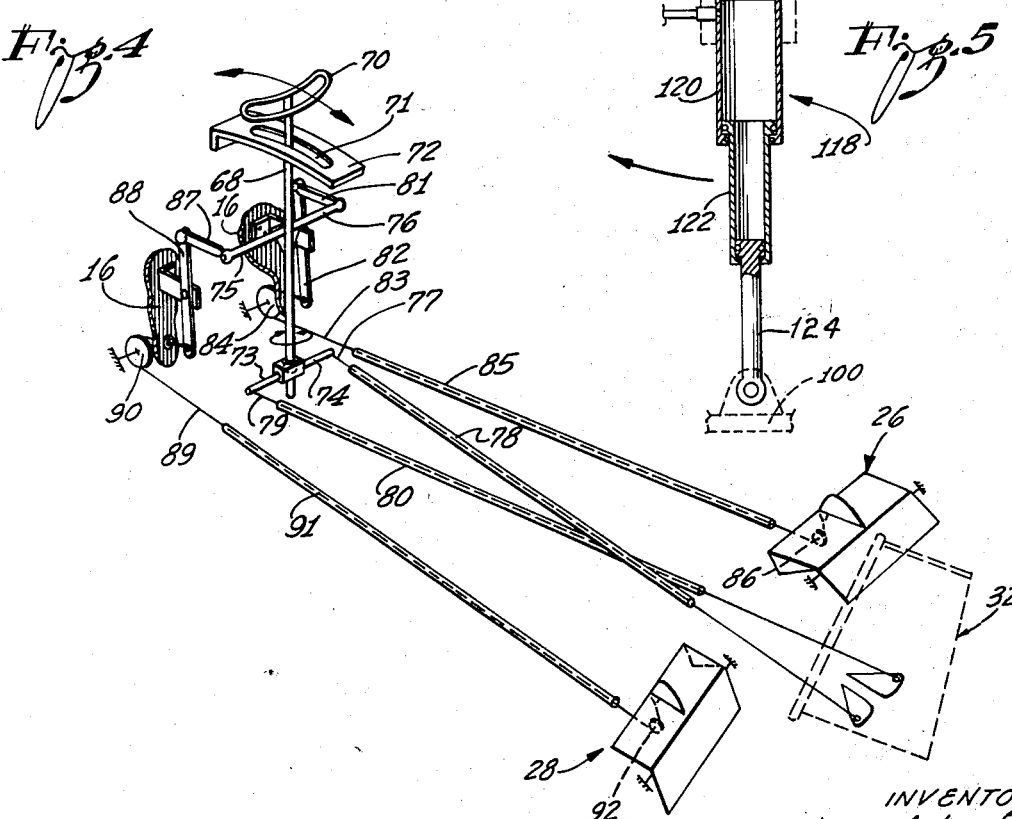
INVENTORS:
Harry A. Laufman
Donald W. Stillman
Attorneys

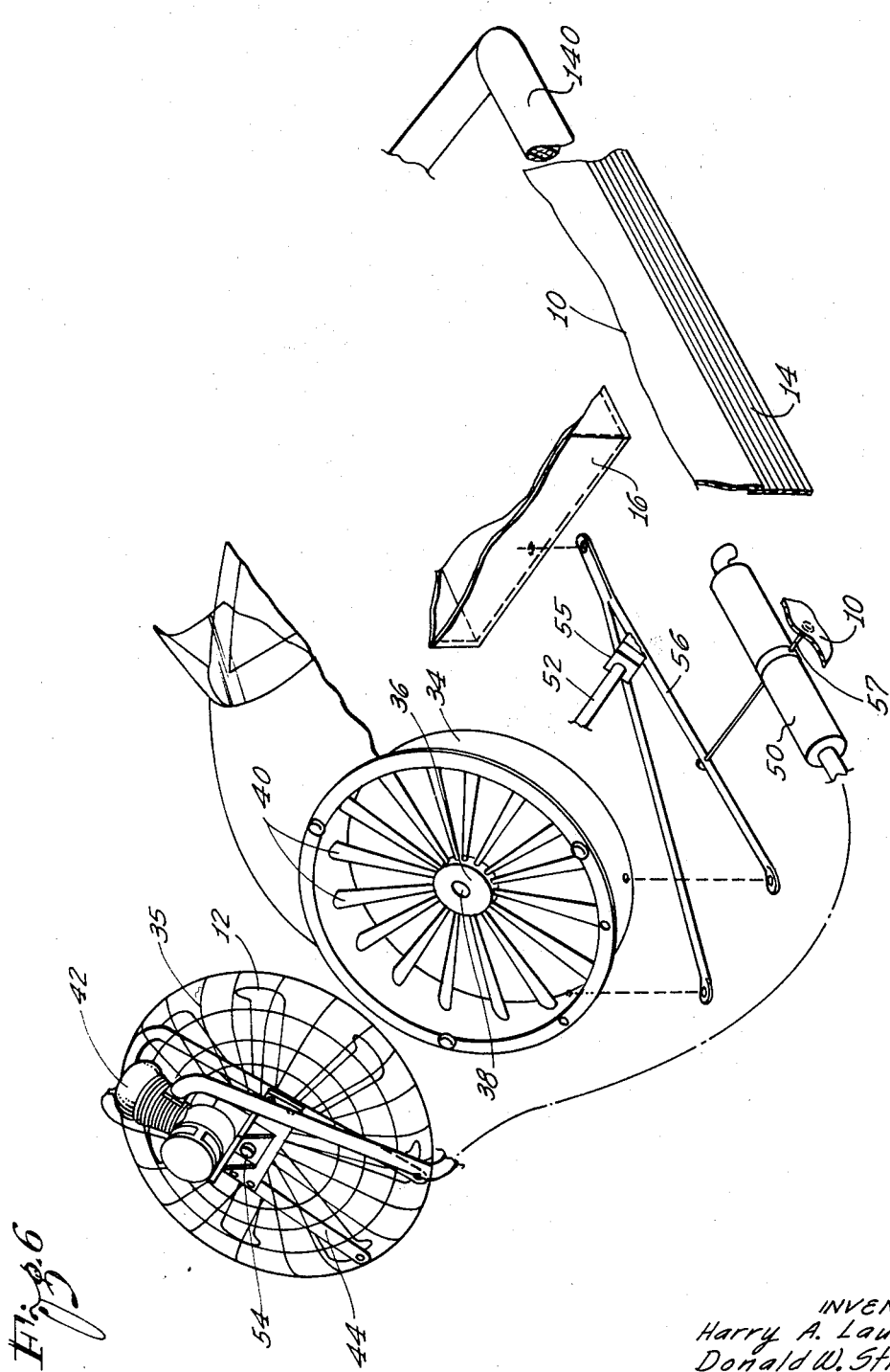

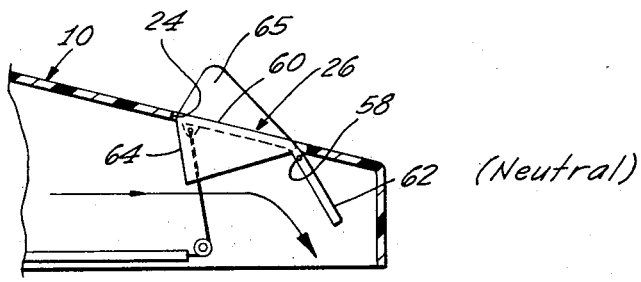
Fig. 7 (Neutral)
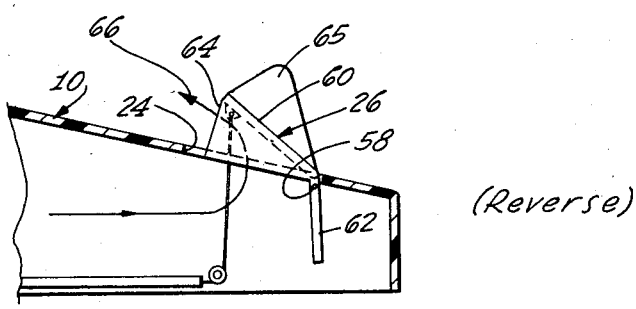
Fig. 8 (Reverse)
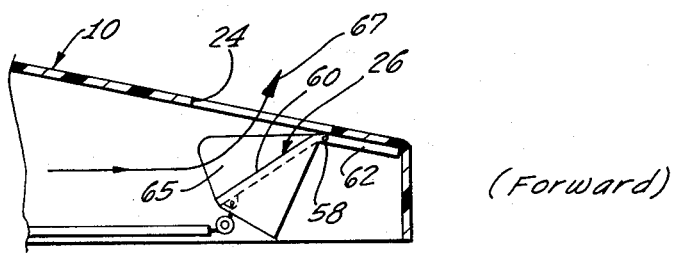
Fig. 9 (Forward)
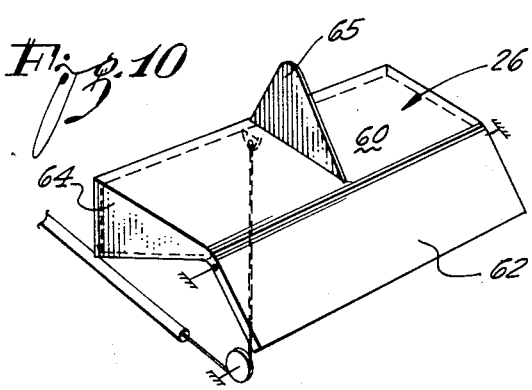
Fig. 10
INVENTORS:
Harry A. Laufman
Donald W. Stillman
Attorneys United States Patent Office 3,401,766
Patented Sept. 17, 1968

3,401,766
AIR-CUSHION VEHICLE
Harry A. Laufman, Los Angeles, and Donald W. Stillman, Playa Del Rey, Calif., assignors to Aircars Incorporated, Los Angeles, Calif., a corporation of California
Filed Nov. 2, 1964, Ser. No. 408,240
13 Claims. (Cl. 180—119)

ABSTRACT OF THE DISCLOSURE

The body of the ground effect vehicle is a single large air-cushion chamber into which air is delivered by a forward fan. A portion of the air is discharged through two rearward ports on opposite sides of the longitudinal axis of the vehicle towards an upright rudder for forward propulsion and steering is accomplished both by the rudder and by variable controlled flaps at the two ports.

---

This invention relates to a ground effect vehicle of the type in which the vehicle body is hollow on its underside to form an air-cushion chamber and the chamber is continuously supplied with air to support the vehicle with no frictional resistance to travel. The invention is directed to an efficient vehicle for this purpose that is of economical construction and is highly maneuverable for safe operation.

The usual vehicle structure comprises a frame on which a body is mounted, and a substantial portion of the cost in materials and labor is represented by the frame. The present invention teaches a vehicle structure which comprises essentially a shell that is self supporting and therefore makes it possible to eliminate the usual frame. The invention further teaches that a cockpit structure may be suspended from the shell and attached to the shell to reinforce the shell. In the preferred practice of the invention, the shell is molded in one operation from a relatively thin sheet of suitable plastic material incorporating glass fibers. Such a shell is not only inexpensive but is also of high strength and light weight.

One problem to which the invention is directed is to incorporate into such a shell structure suitable power actuated means to supply air to the air-cushion chamber. The solution of this problem takes advantage of the fact that the shell has a large forward opening to serve as an air intake and that a circular series of vanes is employed at the opening to counteract the rotary movement of fan-propelled air. The invention teaches that an air intake ring or cylinder braced across its area by the circular series of vanes may be mounted in the intake opening and united with the thin walled body shell in a manner to reinforce the whole front end of the shell.

The required fan at the intake opening is mounted on an inclined shaft with the upper end of the shaft driven by a suitable internal combustion engine that is supported by the intake ring. Thus the intake ring serves the multiple purposes of reinforcing the shell, forming a cylindrical passage for the intake air, supporting the circular series of vanes for countering the rotataion of the airstream, supporting the engine and journaling the upper end of the inclined shaft.

The only frame structure comprises a first frame means mounting the engine on the intake ring and a cooperating second frame means journaling the lower end of the inclined shaft. The second cooperating frame means for the lower end of the shaft connects the lower side of the intake ring with the cockpit structure and thus serves as a brace for both the intake ring and the cockpit structure.

For maneuverability, the vehicle is provided with an upright rudder and two flaps mounted in two rearward openings in the body shell on opposite sides of the longitudinal axis of the shell. In this regard, a feature of the invention is the provision of dual panel flaps that are angled or inclined rearward from perpendicular to the longitudinal axis of the body shell. Thus the hinge axes of the two flaps converge forwardly.

The angled orientation of the two flaps is helpful when the flaps are operated oppositely to cooperate with the rudder to negotiate a turn, the angled orientation increasing the turning moment on the vehicle. A further feature is that the two flaps are provided with fins that also favor the turning moment.

Another feature of the invention resides in the arrangement for controlling the rudder and the flaps advantageously by a single control stick. The lower end of the control stick is anchored by a ball joint to permit the control stick to be swung forward and rearward and at the same time to permit the control stick to rotate about its longitudinal axis. A pair of opposite lateral arms of the control stick at the level of the ball joint control the rudder and an upper pair of opposite lateral arms of the control stick operate the two flaps. Thus the control stick may be swung forward and rearward to raise and lower the two flaps simultaneously or the control stick may be rotated about its longitudinal axis to operate the flaps oppositely and at the same time swing the rudder in a coordinated manner to negotiate a change in direction of the vehicle.

A further feature of the invention is the concept of providing normally retracted skis which may be lowered to support the vehicle in the absence of an air-cushion or under certain conditions when the air-cushion is not fully effective. The skis are useful, for example, to carry the vehicle over a snow crest. The skis may be lowered by fluid pressure and the fluid pressure may be advantageously supplied by a pump or compressor driven by the vehicle engine.

A still further feature of the invention is the use of an elongated float mounted on the lower periphery of the body shell, the float being made of foamed resilient plastic to serve as a bumper to cushion impacts. In the preferred practice of the invention the elongated peripheral float is turned up in front to provide a tilted nose for the vehicle positioned to guard the lower part of the intake ring. The tilted nose further serves as a shield against spray created by impact against waves when the vehicle travels over a large body of water. In addition the upturned nose cushions impact on land when the vehicle noses down at the bottom of a hill.

The features and advantages of the invention may be understood from the foregoing description and the accompanying drawings.

In the drawings, which are to be regarded as merely illustrative:

FIG. 1 is a side elevational view of the presently preferred embodiment of the invention showing the skis lowered to support the vehicle;

FIG. 2 is a plan view of the embodiment;

FIG. 3 is a side elevational view similar to FIG. 1 showing the skis elevated or retracted;

FIG. 4 is a schematic perspective view of the control system and the rudder and the two flaps;

FIG. 5 is a view largely in section showing a power cylinder of telescoping parts that may be used to raise and lower a ski;

FIG. 6 is an exploded view showing structure associated with the intake ring for supporting the invention and the inclined shaft that carries the fan;

FIG. 7 is a simplified sectional view showing one of the two flaps in its neutral position;

FIG. 8 is a similar view showing the flap elevated to create a rearward reaction force;

FIG. 9 is a similar view showing the flap lowered to create a forward reaction force;

FIG. 10 is a perspective view of the right hand flap; and

FIG. 11 is a diagrammatic view showing how manually operable hydraulic means may be provided to lower the skis.

The presently preferred embodiment of the invention shown in the drawings has a thin walled self-supporting body shell 10 that has an open bottom to form an air-cushion chamber for support of the vehicle. It is contemplated that the body shell will be molded from a single sheet of suitable plastic material incorporating reinforcing glass fibers, The body shell 10 has a forward intake opening at which a power driven fan 12 (FIG. 6) is mounted to force air under pressure into the air-cushion chamber. A flexible skirt 14 of suitable plastic material is continuous around the lower peripheral edge of the body shell 10 and depends from the shell to confine the air-cushion. The flexible skirt 14 is inflated by the air-cushion and is thus maintained under circumferential tension. In a well known manner, the provision of the flexible skirt 14 elevates the body shell 10 above minor obstacles and the flexible skirt yields to pass over minor obstacles.

In addition to the intake opening, the body shell 10 has a cockpit opening in which is mounted a box-like cockpit structure having front and rear walls 16 and 18 (FIG. 6), a floor 20 and two opposite side walls 22 (FIG. 2). A suitable windshield 23 extends across the front of the cockpit. The cockpit structure is of unitary construction and is connected to the body shell 10 to form therewith a single self-supporting structure.

The body shell 10 is further provided with two rearward openings 24 and 25 (FIG. 2) in which are mounted corresponding flaps, designated 26 and 28 respectively. A vertical stabilizer fin 30 is mounted between the two rearward openings 24 and 25 and a rudder 32 is hingedly mounted on the trailing edge of the stabilizer.

An intake ring 34 which is best shown in FIG. 6 is mounted in the forward intake opening of the body shell and is united with the body shell. A wire guard 35 spans the intake ring 34 and encloses the fan 12. The intake ring 34 is further provided with a hub 36 with an axial opening 38, the hub being integrally connected with the intake ring by a set of radially disposed vanes 40 which are curved in cross section in a well known manner to counteract the rotary movement imparted to the airstream by the fan 12.

Power means for the air-cushion vehicle may comprise a suitable internal combustion engine 42 which is mounted on the intake ring 34 by a first frame means in the form of a U-shaped tubular frame 44. The engine is served by a fuel tank 45 (FIG. 1) and is suitably controlled by a throttle 46 in the cockpit. The engine 42 is provided with the usual exhaust pipe (FIG. 6) which terminates in a muffler 50 in the lower part of the air-cushion chamber.

The fan 12 is carried by an inclined shaft 52 that is driven by the engine 42 and that extends through the axial opening 38 of the hub 36. The upper end of the inclined shaft 52 is journaled in a bearing 54 carried by the U-shaped frame 44 and the lower end of the shaft is journaled in a bearing 55 that is carried by a second frame means 56 (FIG. 6) of the configuration of a wishbone, the second frame means being rigidly attached to its forward end to two spaced points of the intake ring 34 and being connected at its rearward end to the front wall 16 of the cockpit structure. The muffler 50 is supported by a bar 57 that extends from the second frame means 56 to one side of the body shell 10.

Each of the two flaps 26 and 28 is preferably of the construction shown in FIGS. 7 to 10 which illustrate the flap 26. It is to be noted in FIG. 2 that the two openings 24 and 25 in which the two flaps are mounted are elongated rectangular openings and it is to be noted in FIGS. 7 to 9 that each of the flaps is mounted on a hinge axis 58 which extends along the rear edge of the corresponding opening. An important feature of the invention is that the two flaps 26 and 28 and the corresponding rearward openings 24 and 25 in the body shell 10 are angled or inclined rearward from perpendicular to the longitudinal axis of the vehicle. Thus the two flaps and their hinge axes are forwardly convergent, and any air that is discharged from the air-cushion chamber through the openings 24 and 25 is deflected by the flaps 26 and 28 and will be directed at an acute angle relative to the longitudinal axis of the vehicle. The angled orientation of the flaps is advantageous in being more effective for creating turning moments than flaps that are normal to the longitudinal axis of the vehicle. As shown in FIGS. 7, 8 and 9 each flap 26 and 28 has a forward panel 60 and a rearward panel 62 rigidly connected thereto and forming therewith an obtuse angle, the rearward panel being inside the air-cushion chamber. Each of the forward panels 60 of the two flaps is provided with a triangular side wall 64 (FIG. 10) on its inner side, i.e. on the side nearest the longitudinal axis of the vehicle. In addition each of the forward panels 60 is preferably provided with an upright triangular fin 65 as best shown in FIG. 10.

At the neutral position of a flap shown in FIG. 7, the forward panel 60 spans the corresponding opening 24 or 25 of the body shell 10 in a position substantially flush with the outer surface of the body shell and the rearward panel 62 extends downward and rearward inside the air-cushion chamber. When a flap is elevated as shown in FIG. 8 the forward panel 60 overhangs the corresponding opening 24 or 26 of the body shell and is inclined forwardly and upwardly to permit a stream of compressed air to escape from the air-cushion chamber and to deflect the escaping air forward as indicated by the arrow 66 in FIG. 8. It is to be noted that at this time the rearward panel 62 is in a position that is highly favorable for diversion of the air towards the opening and against the forward panel 60.

When a flap is lowered to its maximum as shown in FIG. 9 with the rearward panel 62 of the flap against the inner surface of the body shell 10, the forward panel 60 of the flap is inclined forwardly and downwardly inside the air-cushion chamber and the vertical fins 65 is also inside the air-cushion chamber. The air escaping from the air-cushion chamber through the opening in the body shell is diverted upwardly and rearwardly as indicated by the arrow 67 in FIG. 9. The vertical fin 65 is in the middle of the airstream and tends to keep the airstream oriented normal to the flap, i.e. at an acute angle relative to the longitudinal axis of the vehicle.

Any suitable control arrangement may be provided to operate the flaps 26 and 28 and the rudder 32. Preferably the control system coordinates the movements of the two flaps with the movements of the rudder 32 for negotiating changes in direction.

The particular control system employed in this embodiment of the invention includes a control stick 68 in the cockpit which control stick is anchored at its lower end by a ball joint as indicated in FIG. 4. The upper end of the control stick 68 is provided with a suitable handle 70 by means of which the control stick may be swung forward or rearward and/or may be rotated about its longitudinal axis. Preferably the control stick 68 is confined to rearward and forward movement by extending through a longitudinal guide slot 71 in a guide member 72.

The control stick 68 is provided with a lower pair of opposite lateral arms 73 and 74 which are in the region of the ball joint 69 and therefore are not affected to any significant degree by forward and rearward swinging of the control stick. The two arms 73 and 74 are suitably operatively connected to the rudder 32 to swing the rudder in response to rotation of the control stick 68. The control stick 68 is further provided with an upper pair of opposite lateral arms 75 and 76 which are suitably operatively connected to the two flaps 26 and 28 respectively to operate the flaps in unison in response to forward and rearward swinging movement of the control stick and to operate the flaps oppositely or differentially in response to rotation of the control stick about its longitudinal axis.

Any suitable means may be provided to connect the arms of the control stick 68 to the rudder 32 and to the two flaps 26 and 28. In the present arrangement, as best shown in FIG. 4, the lower right arm 74 of the control stick is connected to the left side of the rudder 32 by a cable 77 which preferably extends through a guide tube 78 and the lower left arm 73 is in like manner connected to the right side of the rudder by a cable 79 in a guide tube 80, the two guide tubes crossing each other.

The upper right arm 76 of the control stick 68 is connected by a universal joint to a rigid link 81 which in turn is connected by a universal joint to the upper arm of a lever 82. A cable 83 from the lower arm of lever 82 passes around a forward guide pulley 84 to enter a guide tube 85 and from the guide tube passes under a rearward guide pulley 86 to attachment to the right flap 26. In like manner the left flap 28 is controlled from the left arm 75 of the control stick by a second rigid link 87, a second lever 88 and a cable 89 that passes around a forward guide pulley 90 to enter a guide tube 91 and from the guide tube passes under a rearward guide pulley 92. The use of cables to connect the control stick to the two flaps 26 and 28 is effective because air pressure from inside the air-cushion chamber continuously urges the two flaps to their upper positions to maintain the two cables under constant tension.

FIGS. 1, 2 and 6 show how a pair of skis or runners 100 may be provided which are movable between upper retracted positions inside the air-cushion chamber as shown in FIG. 3 and lower positions below the skirt effective to support the vehicle as shown in FIG. 1. As indicated in FIG. 2 the forward ends of the two skis 100 may be pivotally connected to corresponding crank portions 104 of a transverse shaft 105. In the construction shown the central portion of the shaft 105 is journaled in a bearing 106 on the previously mentioned second frame means 56 and the two opposite ends of the shaft are journaled in suitable bearings 108 mounted on the interior of the bdoy shell 10. The two skis 100 are also pivotally connected to crank portions 112 of a rear shaft 114, the rear shaft being journaled in bearings 115 on the underside of the cockpit structure. It is apparent that the two crank portions 104 and 112 that are pivotally connected to each ski function as parallel links.

To shift the skis 100 from their upper retracted positions to their lower effective positions, a forward power cylinder 116 may be connected to the forward portion of each ski and a similar power cylinder 118 may be connected to the rear portion. The upper end of each forward power cylinder 116 is pivotally connected to the cockpit structure and the lower end is pivotally connected to the corresponding crank portion 104 of the forward shaft 105. In like manner each of the rearward power cylinders 118 is pivotally connected at its upper end to the cockpit structure and is pivotally connected at its lower end to the corresponding crank portion 112 of the shaft 114. Since the power cylinders 116 and 118 must contract substantially in length for retraction of the sleeves, each of the power cylinders may be of telescoped construction. Thus FIG. 5 shows how a power cylinder 118 may comprise two telescoping cylinders 120 and 122 in cooperation with a relatively short piston rod 124.

In this particular embodiment of the invention it is contemplated that the power cylinders 116 and 118 will be actuated by compressed air and that the source of the compressed air will be a pump or compressor 125 mounted adjacent the drive shaft 52 for actuation thereby. The compressor 125 is connected by flexible conduit 126 with the four power cylinders 116–118. Incorporated in the structure of the compressor 125 is a suitable clutch (not shown) for operatively connecting the compressor with the drive shaft 52 whenever it is desired to lower the skis 100. The clutch may be controlled by a cable in a conduit 128, the cable being operated by a knob 129 that is within reach in the cockpit structure. When the compressor 125 is idle it vents the four power cylinders to the atmosphere to permit the power cylinders to contract for retraction of the skis.

In this particular embodiment of the invention an elongated member 140 of cylindrical cross sectional configuration extends around the bottom periphery of the body shell to serve the dual purpose of a bumper and a float capable of keeping the vehicle afloat on water. The float 140 is preferably made of a resilient foamed plastic and is turned upward in front to form a tilted nose 142. The tilted nose 142 serves as a guard for the lower portion of the intake opening and also serves as a bumper when the vehicle noses down at the bottom of a hill.

The manner in which the air-cushion vehicle functions for its purpose may be readily understood from the foregoing description. With the engine driving the fan 12 air is driven into the interior of the body shell 10 to maintain air in compression therein and thereby maintain an air-cushion for floating support of the vehicle. If the control stick 70 is at an intermediate position with respect to its forward and rearward swinging movement, the two cables 88 and 92 hold each of the two flaps 26 and 28 at its neutral position shown in FIG. 7. At this neutral position, the forward panel of the flap 60 is in effect merely a continuation of the wall of the shell, the flap substantially closing the corresponding rectangular opening in the shell. Under such conditions the vehicle remains substantially stationary with the vehicle supported by the air-cushion and with air escaping in all directions from the bottom edge of the flexible skirt 14.

If the control stick 70 is pushed straight forward from its normal intermediate position without rotation of the control stick about its own axis, the two cables 88 and 92 pull each of the two flaps 26 and 28 downward to the lower position shown in FIG. 9 to cause an airstream to escape from the air-cushion chamber in an upward and rearward direction as indicated by the arrow 67. The reaction to the airstream has a forward component and a downward component, the forward component drive the vehicle forward.

When the control stick 68 is pulled back from its normal neutral position the two cables 83 and 89 are relaxed to permit the air pressure inside the body shell to lift the two flaps 22 and 28 simultaneously to their upper positions. When a flap is in its upper position as shown in FIG. 8, the flap deflects the outwardly flowing air forwardly and upwardly as indicated by the arrow 66. The result is the creation of an effective reverse thrust or braking action since the reaction to the deflected airstream is downward and rearward.

To negotiate a right turn, the handle 70 is turned clockwise to rotate the control stick 68 clockwise about its longitudinal axis. It is apparent from an inspection of FIG. 4 that the clockwise rotation of the two lower arms 73 and 74 results in counterclockwise rotation of the rudder 32 since the two guide tubes 78 and 80 cross each other, the counterclockwise swing of the rudder tending to turn the vehicle to the right as desired. At the same time the clockwise rotation of the upper arms 75 and 76 results in slackening of the right hand cable 83 to cause raising of the right flap 26 to its upper position and causes tightening of the left cable 89 to pull the left flap 28 downward to its lower position.

The right flap 26 in its elevated position creates a braking force on the right side of the longitudinal axis of the vehicle and at the same time the lowering of the flap 28 creates a forward propulsion force on the left side of the longitudinal axis, the two forces cooperating to create a strong rightward turning moment and the effectiveness of the turning moment is increased by the angled positions of the two flaps. In this regard it is to be noted that the fin 65 of the left flap 28 is in the middle of the air stream as may be seen in FIG. 9 to tend to make the direction of the rearwardly directed airstream conform to the angled position of the flap.

It is to be further noted that with the right flap 26 in its elevated position shown in FIG. 8, the inner side wall 64 of the flap prevents leftward escape of air from under the flap but the right side is open to permit air to escape laterally from the elevated flap. The laterally escaping air creates a leftward reaction force which also assists in turning the vehicle to the right. As a result of all of these forces created by the rudder 32 and the two flaps 26 and 28, the vehicle is capable of making a change in direction on a relatively short radius.

It is apparent that the control stick 68 may be swung forward or rearward and simultaneously rotated about its longitudinal axis. Thus the control stick may be swung forward for acceleration on a turn or may be swung rearward for deceleration on the turn. It is to be noted that the various cables 77, 79, 83 and 89 may be dimensioned in length to have limiting affect on the control stick. Thus with the control stick rotated in one direction to the maximum, moving the control stick forward or rearward from its neutral position will result in reverse rotation of the control stick as the limits of tension of different cables are reached.

If the vehicle stops while on a body of water and the engine is stopped to cause the air-cushion to dissipate, the peripheral float 140 keeps the vehicle from sinking. The same float serves as a bumper on both land and water.

Whenever it is desired to lower the two skis 100, the knob 129 is pulled to cause the compressor 125 to actuate the four power cylinders 116 and 118. When the compressor 125 is stopped, air escapes from the four power cylinders to permit the two skis to be retracted upwardly and rearwardly by swinging movement of the four crank portions 104 and 112 of the two transverse shafts.

FIG. 11 shows how a hand-actuated hydraulic means may be employed to raise and lower the two skis 100. A single forward power cylinder 144 of the construction shown in FIG. 5 is employed for each of the two skis. Hydraulic fluid from a reservoir 145 is supplied to a pump 146 having a handle 148 for manual operation. The pump 146 is connected by conduit means 150 to the two power cylinders 144.

Our description in specific detail of the preferred practice of the invention and of the modification shown in FIG. 11 will suggest various changes, substitutions and other departures from our disclosure within the spirit and scope of the appended claims.

We claim:
1. In an air-cushion vehicle of the character described, the combination of:
   a thin walled self-supporting shell with an open bottom forming an air-chshion chamber, said shell having an air intake opening at its forward end and having a cockpit opening;
   a cockpit structure suspended from the shell in the cockpit opening and being bonded to the shell to reinforce the adjacent portion of the shell;
   a fan mounted in the intake opening to force air into the air-cushion chamber;
   power means to actuate said fan to maintain air under pressure in the air-cushion chamber; and
   elongated means mounted on the lower periphery of the shell to serve as a bumper, said elongated means being made of foamed plastic to serve as float means to support the vehicle on water,
   said elongated means forming an upwardly tilted nose on the front end of the shell.

2. In an air-cushion vehicle of the character described, the combination of:
   a thin walled self-supporting shell with an open bottom forming an air-cushion chamber, said shell having an air intake opening at its forward end and having a cockpit opening;
   an air intake ring mounted in the air intake opening of the shell and bonded to the shell to reinforce the forward portion of the shell;
   a cockpit structure suspended from the shell in the cockpit opening and being bonded to the shell to reinforce the adjacent portion of the shell;
   a first frame means spanning the air intake ring and attached thereto;
   a second frame means inside the shell extending rearward from a lower portion of the intake ring to a lower portion of the cockpit structure and being bonded both to the intake ring and the cockpit structure to reinforce the cockpit structure;
   a drive shaft having its opposite ends rotatably supported by said two frame means respectively;
   a fan on said shaft at the air intake ring to force air into the air-cushion chamber; and
   an engine mounted on the first frame means to actuate the drive shaft.

3. In an air-cushion vehicle of the character described having a body with a hollow underside forming an air-cushion chamber, means to force air into the chamber to maintain an air-cushion under the body, and power means to actuate the air-forcing means, the improvement comprising:
   a pair of longitudinally positioned skis under the body;
   means mounting the skis on the body for movement between upper retracted positions in the air-cushion chamber and lower effective positions to support the vehicle,
   said mounting means including pairs of parallel links connected to the two skis respectively;
   fluid-pressure-actuated means to lower the skis;
   pump means driven by the power means to actuate the fluid-pressure actuated means; and
   manually operable means to control the pump means.

4. In an air-cushion vehicle of the character described, the combination of:
   a thin walled body with an open bottom forming an air-cushion chamber, said body having a forward air intake opening and a central cockpit opening;
   a power-driven fan at the forward intake opening of the body to force air into the air cushion chamber;
   a rearward rudder on the body movable about an upright axis;
   a pair of rearward openings in the body on opposite sides of the longitudinal axis of the body;
   a pair of flaps mounted in the pair of openings respectively, each hinged at its rearward edge for movement through a range of positions including a lower position inside the body, a neutral position substantially flush with the outer surface of the body, and an upper position outside the body;
   a control member in the cockpit mounted by an universal joint and extending upward from the universal joint, the universal joint permitting rotation of the control member about its longitudinal axis and swinging movement of the control member about the universal joint,
   the control member having a pair of opposite radial arms in the region of the universal joint; and
   means operatively connecting the upper portion of the control member to the two flaps respectively and operatively connecting the opposite lateral arms of the control member to the rudder.

5. In an air-cushion vehicle, the combination of:
   a body shell open on its underside to form an air-cushion chamber, the body shell having a forward intake opening and two rearward upper openings on opposite sides of the longitudinal axis of the shell;

two flaps in the rearward openings respectively hingedly connected to the body shell adjacent the rear edges of the openings, each of the flaps having a neutral position at which it is substantially in the plane of the corresponding opening, each of the flaps being movable to an upper position at which it is inclined forward and upward over the corresponding opening, each of the flaps being movable to a lower position at which the flaps are inclined downward and forward inside the air-cushion chamber to deflect air rearwardly and upwardly through the corresponding opening, the hinge axes of the two flaps being forwardly convergent; and control means to operate in one respect to raise and lower the two flaps simultaneously and to operate in a different respect to operate the two flaps oppositely.

6. A combination as set forth in claim 5 in which each of said flaps has a fin substantially perpendicular to its hinge axis, the fin being on the upper side of the flap.

7. In an air-cushion vehicle, the combination of:

a body shell open on its underside to form an air-cushion chamber, the body shell having a forward intake opening and two rearward upper openings on opposite sides of the longitudinal axis of the shell;

two flaps in the rearward opening respectively hingedly connected to the body shell adjacent the rear edges of the openings, each of the flaps having a forward panel extending forward from its hinge axis and a rear panel extending rearwardly and downwardly from its hinge axis at an obtuse angle to the front panel, each of the flaps having a neutral position at which its forward panel is in the plane of the corresponding opening with the rearward panel inclined downwardly and rearwardly inside the air-cushion chamber, each of the flaps being movable to an upper position at which the forward panel is inclined forward and upward from the opening and the rear panel extends downward in the air-cushion chamber to direct air through the corresponding opening towards the forward panel for forward deflection by the forward panel, each of the flaps being movable to a lower position at which the forward panel is inclined downward and forward in the pressure chamber to deflect air rearwardly and upwardly through the corresponding opening; and control means to operate in one respect to raise and lower the two flaps simultaneously and to operate in a different respect to operate the two flaps oppositely.

8. A combination as set forth in claim 7 in which the hinge axes of the two flaps are forwardly convergent whereby airstreams directed by the flaps are at acute angles relative to the longitudinal axis of the vehicle.

9. A combination as set forth in claim 8 in which each of the flaps has a fin substantially perpendicular to its hinge axis, the fin being mounted on the forward panel of the flap and extending upward therefrom.

10. In an air-cushion vehicle, the combination of:

a body shell open on its underside to form an air-cushion chamber, the body shell having a forward intake opening and two rearward upper, openings on opposite sides of the longitudinal axis of the shell;

two flaps in the two rearward openings respectively hingedly connected to the body shell adjacent the rear edges of the openings, each of the flaps having a neutral position at which it is substantially in the plane of the corresponding opening, each of the flaps being movable to an upper position at which it is inclined forward and upward over the corresponding opening to deflect air from the opening forwardly and upwardly, each of the flaps being movable to a lower position at which the panel is inclined downward and forward inside the air-cushion chamber to deflect air rearwardly and upwardly through the corresponding opening;

a control stick mounted on its lower end by a universal joint permitting rotation of the control stick about its longitudinal axis and permitting forward and rearward swinging movement of the control stick about the universal joint, the control stick having an upper pair of opposite lateral arms; and means connecting the two lateral arms to the two flaps respectively to raise and lower the two flaps simultaneously in response to forward and rearward swinging movement of the control stick and to operate the two flaps oppositely in response to rotation of the control stick about its longitudinal axis.

11. In an air-cushion vehicle, the combination of:

a body shell open on its underside to form an air-cushion chamber, the body shell having a forward intake opening and two rearward upper openings on opposite sides of the longitudinal axis of the shell;

two flaps in the rearward openings respectively hingedly connected to the body shell adjacent the rear edges of the openings, each of the flaps having a neutral position at which it is substantially in the plane of the corresponding opening, each of the flaps being movable to an upper position at which it is inclined forward and upward over the corresponding opening to deflect air therefrom forwardly and upwardly, each of the flaps being movable to a lower position at which the panel is inclined downward and forward inside the air-cushion chamber to deflect air rearwardly and upwardly through the corresponding opening;

an upright rudder on the rear end of the body;

a control stick mounted at its lower end by a universal joint permitting rotation of the control stick about its longitudinal axis and permitting forward and rearward swinging movement of the control stick about the universal joint, said control stick having a lower pair of opposite radial arms in the region of the universal joint and having an upper pair of opposite radial arms;

means operatively connecting the lower pair of arms of the control stick to the rudder to swing the rudder to the right for a right turn in response to clockwise rotation of the control stick and to swing the rudder to the left for a left turn in response to counterclockwise rotation of the control stick; and means connecting the upper pair of arms of the control stick to the two flaps respectively to raise and lower the flaps simultaneously in response to rearward and forward swinging movement of the control stick, to lower the left flap and raise the right flap in response to clockwise rotation of the control stick, and to raise the left flap and lower the right flap in response to counterclockwise rotation of the control stick.

12. A combination as set forth in claim 11 in which the means that connects the lower pair of arms of the control stick to the rudder comprises a first pair of cables, the cables crossing each other;

in which the means connecting the upper pair of arms of the control stick to the two flaps respectively comprises a second pair of cables; and in which guide means is provided for the second pair of cables, the second pair of cables extending forward from the region of the control stick to the guide means and then extending rearward to the two flaps respectively.

13. A combination as set forth in claim 12 which includes two levers corresponding to the two flaps, one arm of each lever being connected to the corresponding upper arm of the control stick, the other arm of the lever being connected to a corresponding one of each of said second cables.

References Cited

UNITED STATES PATENTS

| | | | |
|---|---|---|---|
| 2,339,886 | 1/1944 | Shannon | 180—5 |
| 2,384,441 | 9/1945 | Carter | 180—3 |
| 2,487,297 | 11/1949 | Berman | 180—5 |
| 2,883,233 | 4/1959 | Beckley | 296—31 X |
| 3,073,549 | 1/1963 | Griffith | 180—7 X |
| 3,118,513 | 1/1964 | Cockerell | 180—7 |
| 3,168,928 | 2/1965 | Ljungstrom | 180—7 |
| 3,172,494 | 3/1965 | Cockerell | 180—7 |
| 3,177,959 | 4/1965 | Gaska | 180—7 |

A. HARRY LEVY, *Primary Examiner.*